Figure 1:
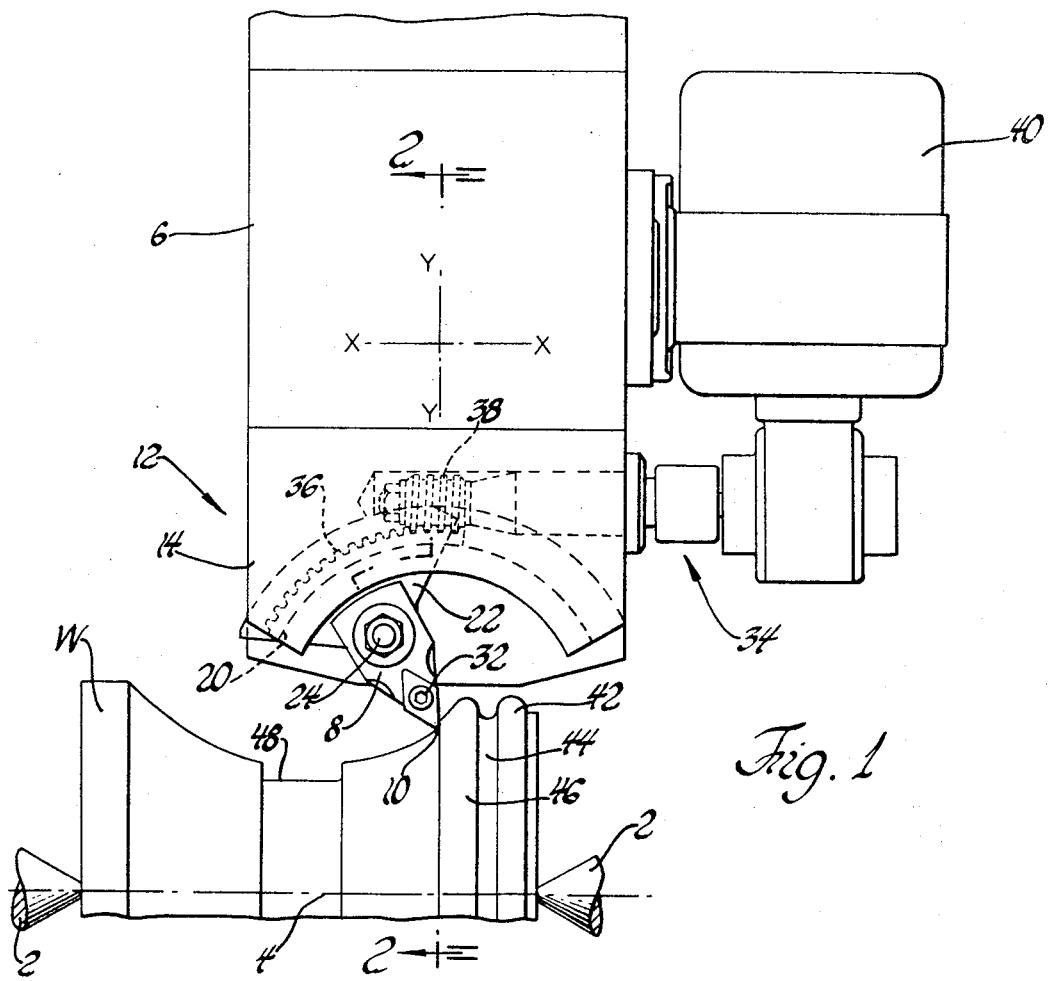

United States Patent [19]
Anderson et al.

[11] 3,744,357
[45] July 10, 1973

[54] PROFILE CUTTING TOOL

[75] Inventors: Marvin R. Anderson, Grosse Pointe Shores; Harald N. Jungesjo, Rochester, both of Mich.

[73] Assignee: Anderson-Cook Incorporated, St. Clair Shores, Mich.

[22] Filed: Sept. 27, 1971

[21] Appl. No.: 184,155

[52] U.S. Cl. ................................................. 82/12
[51] Int. Cl. ............................................... B23b 5/40
[58] Field of Search ........................................ 82/12

[56] References Cited
UNITED STATES PATENTS

| | | | |
|---|---|---|---|
| 3,128,657 | 4/1964 | Hebert | 82/12 X |
| 3,135,148 | 6/1964 | Cole et al. | 82/12 X |
| 2,167,766 | 8/1939 | Mirfield | 82/12 X |
| 2,933,965 | 4/1960 | Murphy | 82/12 |

*Primary Examiner*—Leonidas Vlachos
*Attorney*—Gerald E. McGlynn, Owen E. Perry Jr. et al.

[57] ABSTRACT

Machine tool apparatus including workpiece supporting means for supporting and rotating a workpiece, and a tool holder movable in parallel and transverse directions with respect to the rotary axis of the workpiece supporting means. A cutting or grinding tool is mounted on the tool holder for selective rotation about a tool axis, the tool having a workpiece engaging portion located on the tool axis so that the tool can extend perpendicularly to the surface of a workpiece regardless of the contour of the workpiece as the tool holder moves the tool along the length of the workpiece.

2 Claims, 2 Drawing Figures

Patented July 10, 1973 3,744,357

INVENTORS
Marvin R. Anderson &
BY Harald N. Jurgesjo
Barnard, McGlynn & Reising

PROFILE CUTTING TOOL

This invention relates generally to machine tools for cutting and grinding metal workpieces and is particularly concerned with machine tools having fixed cutting or grinding tools which engage a rotating workpiece for machining the workpiece to a desired profile or contour.

Presently available machine tools of this type include those having an indexable tool holder for carrying several cutting tools which are selectively engageable with a rotating workpiece. Each of the tools has a fixed relationship with respect to the tool holder. As the workpiece rotates, its surfaces are machined by one of the tools carried by the indexable tool holder. When the contour or profile of the workpiece changes abruptly, the tool holder is indexed to present a different cutting tool to engage the workpiece. Each time that there is an abrupt change in the contour of the workpiece, the cutting operation must be interrupted in order to index the tool holder.

The prior art also includes machine tool apparatus having tool holders for holding power tools for machining stationary workpieces, the tool holders being adjustable in several directions, or about a plurality of axes, to present the tools to different portions of the stationary workpieces.

Examples of prior art devices in this field are disclosed in U.S. Pat. Nos. 1,138,347; 2,750,851 and 3,413,893.

An object of this invention is to provide a machine tool for cutting and grinding a rotating workpiece wherein a single cutting or grinding tool is mounted on a tool holder in such a manner that the cutting tool can be maintained substantially in perpendicular relationship with the surface of a rotating workpiece regardless of abrupt changes in the contour of the workpiece.

A further object is to provide a machine tool apparatus for supporting a rotary workpiece and having a tool holder movable in parallel and transverse directions with respect to the rotary axis of the workpiece with a tool having a workpiece engaging edge and mounted on the tool holder for selective rotation about the workpiece engaging edge of the tool so that the tool can be maintained in perpendicular relationship with respect to the rotary workpiece as it is carried by the tool holder along the axis of the workpiece regardless of changes in the contour of the workpiece.

In carrying out the foregoing, and other objects, machine tool apparatus according to the present invention includes means for supporting and rotating a workpiece; a tool holder movable in parallel and transverse directions with respect to the rotary axis of the workpiece, and a tool for engaging the workpiece and performing a machining operation on the workpiece. The tool is mounted on the tool holder for selective rotation about a tool axis which extends perpendicular to the rotary axis of the workpiece, and the workpiece engaging edge of the tool is located on the tool axis.

The tool is mounted on the tool holder by mounting means including a circular track member having its geometric center located on the tool axis, and a circular slide member mounted on the track member, the tool being secured to the slide member and extending radially therefrom. As the tool holder moves the tool along the length of the rotating workpiece, the tool is maintained in substantially perpendicular relationship with the surface of the tool by actuation of the slide member along the track member so that the tool can pass over abrupt changes in the contour of the workpiece without interruption of the machining operation.

Figure 2:
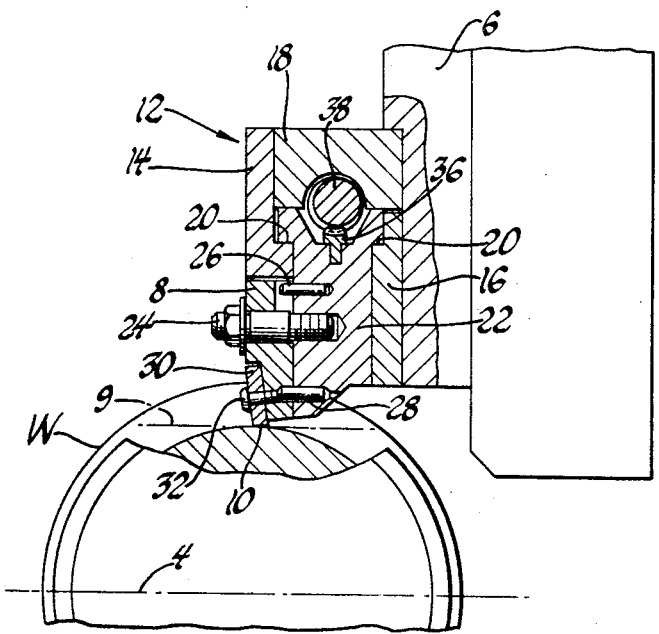

Other objects, advantages and features of the invention will become apparent from the following description taken in connection with the accompanying drawings in which:

FIG. 1 is an elevational view of machine tool apparatus embodying the invention; and FIG. 2 is a sectional view taken on lines 2—2 of FIG. 1.

The drawings illustrate machine tool apparatus including workpiece supporting means including turning centers 2 for supporting and rotating a workpiece W about an axis 4. A slide or tool holder 6 is movable in the directions of the X and Y axes illustrated in FIG. 1 which are respectively parallel and transverse directions with respect to the rotary axis 4 of the workpiece W. A tool 8 is carried by the tool holder 6, the tool 8 having a workpiece engaging portion, or cutting edge 10. Reference numeral 12 collectively designates mounting means mounting the tool 8 on the tool holder 6 for selective rotation about a tool axis 9 (FIG. 2) perpendicular to the rotary axis 4 of the workpiece W, the workpiece engaging portion 10 of the tool 8 being located on the tool axis 9.

The mounting means 12 includes an outer plate member 14 secured to a head portion 18, the head portion 18 in turn being secured to the tool holder 6, and an inner plate member 16 secured to the tool holder 6 beneath the head portion 18. The plate members 14 and 16 are formed with shoulders 20 defining a circular track having its geometric center located on the tool axis 9. A circular slide member 22 is mounted on the track member 20, the tool 8 being secured to the slide member 22 and extending radially therefrom to the tool axis 9. The tool 8 is secured to the slide member 22 by a bolt 24 threadedly engaged with the slide member 22, and by pins 26 and 28. The cutting blade 30 of the tool is secured to the tool 8 by a screw 32. It is apparent that movement of the slide member 22 along the circular track 20 causes the tool 8 to rotate about the cutting edge 10, and hence the axis 9.

The mounting means 12 further includes drive means 34 for actuating the slide member 22 to slide along the circular track member 20 and hence rotate the tool 8 about the workpiece engaging portion 10 thereof. The drive means 34 includes a toothed sector 36 secured to the slide member 22, and a worm gear 38 meshed with the sector 36 and extending into a recess formed in the head portion 18. A reversible motor 40 is mounted on the tool holder 6 and is coupled with the worm gear 38 so that actuation of motor 40 causes rotation of the worm gear 38 to change the position of the circular slide 22 along the track 20, and hence change the position of tool 8 about the tool axis 9.

The tool holder 6 is powered by a motor (not shown) to move along the directions of the X and Y axes. A motor for driving the tool holder 6, as well as the motor 40 for driving the worm gear 38, can be tape driven and programmed to drive the tool 8 in a specific path to machine the workpiece W to a contour determined by the programmed path of the tool 8. Since the cutting tool 8 is always maintained in a perpendicular relationship with respect to the surface of the workpiece W, it is not necessary to change cutting tools when the contour of the workpiece changes abruptly. For example, the illustrated workpiece W is machined to have projections 42 and 46 separated by a depression 44, and a central despression 48. As the tool 8 moves from right to left as viewed in FIG. 1 along the length of the workpiece W, the tool is maintained by worm gear 38 in perpendicular relationship with the surface of the workpiece W so that the tool 8 can machine all surfaces of the workpiece W.

While a specific form of the invention has been described in the foregoing specification and illustrated in the accompanying drawings, it should be understood that the invention is not limited to the exact construction shown. Various alternatives in the construction and arrangement of parts, all falling within the scope and spirit of the invention, will be apparent to those skilled in the art.

We claim:

1. Machine tool apparatus comprising: workpiece supporting means for supporting and rotating a workpiece; a tool holder movable in parallel and transverse directions with respect to the rotary axis of said workpiece supporting means; a tool having a workpiece engaging portion; mounting means mounting said tool on said t tool holder for selective rotation about a tool axis perpendicular to the rotary axis of said workpiece supporting means, said workpiece engaging portion of said tool being located on said tool axis; said mounting means including a head portion secured to said tool holder, an outer plate member secured to said head portion in spaced relationship with said tool holder and an inner plate member secured to said tool holder in spaced relationship with said outer plate member, said inner and outer plate members being formed on their opposed faces with shoulders defining a circular track having its geometric center located on said tool axis, a circular slide member received between said plate members and mounted on said circular track, said tool being secured to said slide member, a circular toothed sector secured to said slide member in concentric relationship therewith, a recess formed in said head portion, and a worm gear extending into said recess and meshed with said toothed sector operable upon rotation to cause said slide member and hence said tool to rotate about said tool axis.

2. Apparatus as claimed in claim 1 further including a reversible motor mounted on said tool holder and coupled with said worm gear.

* * * * *